US009810461B2

(12) United States Patent
Zhan et al.

(10) Patent No.: US 9,810,461 B2
(45) Date of Patent: Nov. 7, 2017

(54) ELECTRONIC EXPANSION VALVE

(75) Inventors: Caiyi Zhan, Zhejiang Province (CN);
Ze Yuan, Zhejiang Province (CN);
Xianrang Wei, Zhejiang Province (CN)

(73) Assignee: Zhejiang Sanhua Intelligent Controls Co., Ltd., Shaoxing, Zhejiang (CN)

( * ) Notice: Subject to any disclaimer, the term of this patent is extended or adjusted under 35 U.S.C. 154(b) by 386 days.

(21) Appl. No.: 14/408,284

(22) PCT Filed: Aug. 10, 2012

(86) PCT No.: PCT/CN2012/079936
§ 371 (c)(1),
(2), (4) Date: Dec. 15, 2014

(87) PCT Pub. No.: WO2013/189120
PCT Pub. Date: Dec. 27, 2013

(65) Prior Publication Data
US 2015/0114495 A1 Apr. 30, 2015

(30) Foreign Application Priority Data
Jun. 20, 2012 (CN) .......................... 2012 1 0208265

(51) Int. Cl.
*F15B 13/04* (2006.01)
*F25B 41/06* (2006.01)
*F16K 15/18* (2006.01)

(52) U.S. Cl.
CPC ............ *F25B 41/062* (2013.01); *F16K 15/18* (2013.01); *F25B 2341/06* (2013.01);
(Continued)

(58) Field of Classification Search
CPC .... Y10T 137/7771–137/7779; Y10T 137/778; Y10T 137/88022;
(Continued)

(56) References Cited

U.S. PATENT DOCUMENTS 596,601 A * 1/1898 Knox .................. G05D 23/185
137/505.26
2,345,306 A 3/1944 Van Der Werff
(Continued)

FOREIGN PATENT DOCUMENTS

CN 85201792 U 8/1986
CN 1132328 A 10/1996
(Continued)

OTHER PUBLICATIONS

International Search Report dated May 23, 2013 from potentially related International Application No. PCT/CN2012/079939.
(Continued)

*Primary Examiner* — Craig J Price
(74) *Attorney, Agent, or Firm* — Wolf, Greenfield & Sacks, P.C.

(57) ABSTRACT

An electronic expansion valve is provided, wherein a piston component and a valve needle component are located at the same side of a valve core seat. When refrigerant flows forwards, the piston component closes the bypass through hole, the refrigerant flows to a side of the vertical connecting pipe via the valve core valve port, and the valve needle component moves in the axial direction to regulate an opening of the valve core valve port. When the refrigerant flows reversely, the piston component moves upwards in the axial direction to open the bypass through hole, and the refrigerant flows to a side of the transverse connecting pipe via the bypass through hole. The electronic expansion valve ensures that the valve needle component seals the valve core valve port easily in a high pressure state when the refrigerant flows forwards, and reduces axial and radial dimensions of the valve seat.

19 Claims, 10 Drawing Sheets

(52) U.S. Cl.
CPC . *F25B 2341/065* (2013.01); *F25B 2400/0411* (2013.01); *Y02B 30/72* (2013.01); *Y10T 137/87177* (2015.04)

(58) Field of Classification Search
CPC ....... Y10T 137/8803; Y10T 137/88038; Y10T 137/87177; F25B 2341/06; F25B 2341/061; F25B 2341/062; F25B 2341/064; F25B 2341/0653; F25B 2341/066–2341/0662; F25B 2341/0671; F25B 2341/068–2341/0683; F25B 41/062; F25B 2341/065; F25B 2400/0411; F16K 15/18; F16K 3/246; F16K 3/26; F16K 3/262; F16K 3/265; F16K 3/267; F16K 47/08; Y02B 30/72
USPC .............. 137/601.2, 601.12, 599.11, 599.16, 137/599.18; 62/222, 324.6; 236/92 B
See application file for complete search history.

(56) References Cited

U.S. PATENT DOCUMENTS

| | | | | |
|---|---|---|---|---|
| 5,626,030 | A * | 5/1997 | Nagai | F16K 1/54 137/599.11 |
| 6,220,571 | B1 * | 4/2001 | Kim | F16K 31/047 251/129.11 |
| 7,854,390 | B2 * | 12/2010 | Hayashi | F25B 41/062 236/92 B |
| 8,157,183 | B2 * | 4/2012 | Hayashi | F25B 41/062 236/92 B |
| 8,556,229 | B2 * | 10/2013 | Lv | F16K 31/047 251/129.11 |
| 8,651,456 | B2 * | 2/2014 | Zhan | F25B 41/062 251/276 |
| 8,763,419 | B2 * | 7/2014 | Suganama | F16K 15/18 137/601.14 |
| 9,341,399 | B2 * | 5/2016 | Zhan | F25B 41/062 |
| 2006/0273272 | A1 * | 12/2006 | Uchida | F16K 39/022 251/129.11 |
| 2009/0020716 | A1 * | 1/2009 | Hokazono | F16K 31/047 251/129.11 |
| 2009/0057590 | A1 | 3/2009 | Kok-Hiong et al. | |
| 2009/0293520 | A1 | 12/2009 | Hayashi et al. | |
| 2010/0263397 | A1 | 10/2010 | Suganuma | |
| 2015/0122360 | A1 * | 5/2015 | Zhan | F25B 41/062 137/630.12 |
| 2015/0184768 | A1 * | 7/2015 | Zhan | F25B 41/062 251/65 |

FOREIGN PATENT DOCUMENTS

| | | |
|---|---|---|
| CN | 1297518 A | 5/2001 |
| CN | 1762746 A | 4/2006 |
| CN | 2931997 Y | 8/2007 |
| CN | 200968423 Y | 10/2007 |
| CN | 101135387 A | 3/2008 |
| CN | 101458020 A | 6/2009 |
| CN | 201262233 Y | 6/2009 |
| CN | 201327255 Y | 10/2009 |
| CN | 101678822 A | 3/2010 |
| CN | 102032380 A | 4/2011 |
| CN | 102042416 A | 5/2011 |
| CN | 102252119 A | 11/2011 |
| CN | 202176805 U | 3/2012 |
| CN | 202182593 U | 4/2012 |
| CN | 102454819 A | 5/2012 |
| DE | 102006060099 A1 | 6/2008 |
| JP | 2000227165 A | 8/2000 |
| JP | 2001091109 A | 4/2001 |
| JP | 2001304445 A | 3/2003 |
| JP | 2003065454 B2 | 3/2003 |
| JP | 4285155 B2 | 4/2009 |
| JP | A 2009287913 | 12/2009 |
| JP | 2010249246 A | 11/2010 |
| JP | 2012047213 A | 3/2012 |
| KR | 100552942 B1 | 2/2006 |

OTHER PUBLICATIONS

International Search Report dated Feb. 28, 2013 from potentially related International Application No. PCT/CN2012/079932.
International Search Report dated Feb. 28, 2013 from potentially related International Application No. PCT/CN2012/079933.
International Search Report dated Feb. 28, 2013 from potentially related International Application No. PCT/CN2012/079927.
International Search Report dated Feb. 28, 2013 from potentially related International Application No. PCT/CN2012/079930.
Chinese Office Action, dated Dec. 28, 2015, from corresponding Chinese Patent Application No. 201210208265.1.

* cited by examiner

ELECTRONIC EXPANSION VALVE

The present application is the national phase of International Application No. PCT/CN2012/079936, filed on Aug. 10, 2012, which claims the benefit of priority to Chinese Patent Application No. 201210208265.1 titled "ELECTRONIC EXPANSION VALVE", filed with the Chinese State Intellectual Property Office on Jun. 20, 2012, the entire disclosures of both applications are incorporated herein by reference.

TECHNICAL FIELD

The present application relates to the technical field of fluid control components, and particularly to an electronic expansion valve.

BACKGROUND

In the air conditioner market, two electronic expansion valves are employed since an indoor unit is disposed far away from an outdoor unit of an air conditioner. In addition, each of the two electronic expansion valves is required to be connected to a respective one-way valve in parallel to improve the system efficiency to the greatest extent. The schematic diagram of the system of the air conditioner is shown in FIG. 1, and the working principle is briefly described as follows.

The refrigerating operation is described as follows. Gaseous refrigerant with high temperature and high pressure which is discharged from a gas discharge pipe of a compressor 7'8 passes through, in turn, a connecting pipe D and a connecting pipe E of a four-way valve 7'1, an outdoor heat exchanger 7'2 (releasing heat by condensation), a first one-way valve 7'4 (here, a first electronic expansion valve 7'3 does not function to regulate the flow), and a second electronic expansion valve 7'5 (here, a second one-way valve 7'6 is closed, and the second electronic expansion valve 7'5 functions to regulate the flow), and finally enters into an indoor heat exchanger 7'7 to be evaporated, so as to absorb heat to realize the refrigerating function. Here, the second electronic expansion valve 7'6 is close to the indoor heat exchanger 7'7, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the outdoor heat exchanger 7'2 passes through the first electronic expansion valve 7'3, a throttling effect may still occur even when the expansion valve is fully opened, which reduces the pressure of the refrigerant, and then when the refrigerant is transferred to the second electronic expansion valve 7'5, it is apt to be gasified partly, therefore the throttling effect of the electronic expansion valve is adversely affected, and the system efficiency is reduced.

The heating operation is described as follows. Gaseous refrigerant with high temperature and high pressure which is discharged from the gas discharge pipe of the compressor 7'8 passes through, in turn, the connecting pipe D and a connecting pipe C of the four-way valve 7'1, the indoor heat exchanger 7'7 (releasing heat by condensation), the second one-way valve 7'6 (here, the second electronic expansion valve 7'5 does not function to regulate the flow), the first electronic expansion valve 7'3 (here, the first one-way valve 7'4 is closed, and the first electronic expansion valve 7'3 functions to regulate the flow), and finally enters into the outdoor heat exchanger 7'2 to be evaporated, so as to absorb heat to realize the refrigerating function. Here, the first electronic expansion valve 7'3 is close to the outdoor heat exchanger 7'2, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the indoor heat exchanger 7'7 passes through the second electronic expansion valve 7'5, the throttling effect may still occur even when the expansion valve is fully opened, which reduces the pressure of the refrigerant, and then when the refrigerant flows to the first electronic expansion valve 7'3, it is apt to be gasified partly, therefore the throttling effect of the electronic expansion valve is adversely affected, and the system efficiency is reduced.

However, in the current market, some customers require to integrate the one-way valve with the electronic expansion valve, so as to reduce the numbers of parts and solder joints, and to further improve the reliability of the system.

In view of this, in the conventional technology, an electronic expansion valve with function of a one-way valve is disclosed in Japanese Patent Application Publication No. 2010-249246. Reference may be made to FIGS. 2 and 3. FIG. 2 is a schematic view showing the structure of an electronic expansion valve in the conventional technology which is performing a flow regulation when the refrigerant flows forwards; and FIG. 3 is a schematic view showing the structure of the electronic expansion valve in the conventional technology, wherein the electronic expansion valve is opened when the refrigerant flows reversely.

As shown in FIGS. 2 and 3, a valve core seat 22 is fixed in a valve seat 20, and a valve port 22a is provided in the valve core seat 22. A plurality of small holes 72 are distributed around the valve port 22a. An inlet connecting pipe seat 45 and the valve seat 20 are connected by screw threads to form a main valve body. A secondary valve cavity is formed between the valve seat 20 and the inlet connecting pipe seat 45, and a one-way valve core 60 is provided in the secondary valve cavity. When the refrigerant flows forwards (that is, the refrigerant flows from an inlet connecting pipe 17 to an outlet connecting pipe 16), the inlet connecting pipe 17 is in a high pressure zone and the outlet connecting pipe 16 is in a low pressure zone, thus the one-way valve core 60 is pushed towards the valve core seat 22 to close the small holes 72, and then a valve needle 24 is driven by a drive mechanism to move close to or away from the valve port 22a, thereby regulating an opening of the valve port 22a, and realizing the flow regulation of the system. When the refrigerant flows reversely (that is, the refrigerant flows from the outlet connecting pipe 16 to the inlet connecting pipe 17), the outlet connecting pipe 16 is in the high pressure zone and the inlet connecting pipe 17 is in the low pressure zone, thus the one-way valve core 60 is pushed away from the valve core seat 22 to open the small holes 72, and the refrigerant mostly flows through the small holes 72. Since a plurality of small holes 72 may be provided, a sum of flow areas of the small holes is large, which may greatly reduce the flow resistance of the product.

However, the conventional electronic expansion valve described above has the following defects.

Firstly, in the above structure, the one-way valve core 60 is provided at a lower portion of the valve core seat 22, and the one-way valve core 60 and the valve needle 24 are respectively arranged at two sides of the valve core seat 22. When the refrigerant flows forwards, the refrigerant may generate a large upward impact force, which requires that a buffer spring provided in the valve needle 24 has a large spring force to ensure the sealing performance of the valve needle 24 under a high pressure condition. However, a series of problems may be caused when the spring force is increased, for example, the difficulty of rotation of the valve needle 24 may be increased, and the size of the product may be increased. Generally, it is fairly well that the spring can be designed to ensure the sealing performance when subjected to a refrigerant pressure of 2.5 Mpa, and the product of this structure is hard to ensure the sealing performance under a refrigerant pressure of 3.5 MPa.

Secondly, the one-way valve 60 is mounted at the lower portion of the valve core seat 22, which further requires the one-way valve 60 to have a certain stroke, thus it inevitably requires the lower portion of the valve core seat 22 to have a large mounting space, which may increase the axial height of the valve body.

Thirdly, the one-way valve core 60 is required to be provided with a bypass flow passage 70, thus when flowing reversely, the refrigerant needs to pass through the bypass flow passage 70, which results in a large reverse flow resistance. On this basis, in order to reduce the reverse flow resistance, the valve seat 20 is required to have a sufficiently large diameter, which may in turn result in a large radial dimension of the valve seat 20.

SUMMARY

One technical problem to be solved by the present application is to provide an electronic expansion valve, and the structural design of the electronic expansion valve may, on one hand, ensure that the valve needle component may seal the valve core valve port easily in a high pressure state when the refrigerant flows forwards, thereby preventing the valve needle component from being pushed away by the refrigerant with high pressure, and on the other hand, reduce the axial dimension and the radial dimension of the valve seat, and reduce the flow resistance when the refrigerant flows reversely.

To solve the above technical problems, an electronic expansion valve is provided according to the present application, which includes a valve seat, the valve seat being provided with a valve cavity, a valve core seat being fixed in the valve cavity, and the valve core seat being provided with a valve core valve port and a bypass through hole; the electronic expansion valve further including a valve needle component which is movable in an axial direction to cooperate with the valve core valve port and a piston component which is movable in the axial direction to open and close the bypass through hole; and the electronic expansion valve further including a transverse connecting pipe functioning as an inlet connecting pipe and a vertical connecting pipe functioning as an outlet connecting pipe; wherein, the piston component and the valve needle component are located at the same side of the valve core seat, and in a case that refrigerant flows forwards, the piston component closes the bypass through hole, the refrigerant flows to a side of the vertical connecting pipe via the valve core valve port, and the valve needle component moves in the axial direction to regulate an opening of the valve core valve port; and in a case that the refrigerant flows reversely, the piston component moves upwards in the axial direction to open the bypass through hole, and the refrigerant flows to a side of the transverse connecting pipe via the bypass through hole.

Preferably, the valve core seat and the valve seat are formed separately, and the valve core seat is fixedly connected to an inner wall of the valve seat.

Preferably, the valve core seat includes a body portion and a sleeve guiding portion; the valve core valve port and the bypass through hole are arranged in the body portion, and a lower end of the sleeve guiding portion surrounds the valve core valve port, and the valve needle component extends into an inner hole of the sleeve guiding portion to cooperate with the valve core valve port and is guided by the inner hole of the sleeve guiding portion.

Preferably, the piston component is provided with a center hole, and the piston component is axially movably sleeved on an outer wall of the sleeve guiding portion via the center hole.

Preferably, one of an inner wall of the center hole and an outer wall of the sleeve guiding portion is provided with a positioning groove extending in an axial direction, and the other one of the inner wall of the center hole and the outer wall of the sleeve guiding portion is provided with a positioning protrusion slidable in the positioning groove.

Preferably, a side of the piston component facing the transverse connecting pipe has a portion being cut out to form a cutout portion.

Preferably, a sidewall of the sleeve guiding portion is provided with a sidewall through hole which is configured to communicate the inner hole of the sleeve guiding portion with the valve cavity.

Preferably, the piston component includes a piston body portion and a piston guiding portion protruding upwards along the piston body portion, and the center hole passes through the piston body portion and the piston guiding portion.

Preferably, a sidewall of the piston guiding portion is further provided with a piston side hole at a position corresponding to the sidewall through hole.

Preferably, the electronic expansion valve further includes a drive component configured to drive the valve needle component to move in the axial direction, wherein the drive component includes a screw rod and a nut cooperating with the screw rod by screw threads; and a lower portion of the nut is provided with a guiding hole, and an upper portion of the sleeve guiding portion is fit in the guiding hole via an outer wall of the sleeve guiding portion and is guided by the guiding hole.

Preferably, a compressed elastic component is provided between a top wall of the piston component and the nut.

Based on the conventional technology, in the electronic expansion valve according to the present application, the piston component and the valve needle component are located at the same side of the valve core seat, thus when the refrigerant flows forwards, the piston component closes the bypass through hole, the refrigerant flows to the side of the vertical connecting pipe via the valve core valve port, and the valve needle component moves in the axial direction to regulate an opening of the valve core valve port. When the refrigerant flows reversely, the piston component moves upwards in the axial direction to open the bypass through hole, and the refrigerant flows to the side of the transverse connecting pipe via the bypass through hole.

When the refrigerant flows forwards, the refrigerant flows in via the transverse connecting pipe and flows out via the vertical connecting pipe, thus the side of the transverse connecting pipe is in a high pressure zone and the side of the vertical connecting pipe is in a low pressure zone. Under the action of pressure difference of the system, the piston component moves downward to close the bypass through hole. Then the valve needle component is driven by a drive component of the electronic expansion valve to move upward and downward in the axial direction, thereby regulating the opening of the valve core valve port and achieving the object of regulating the flow of the refrigerant.

When the refrigerant flows reversely, the refrigerant flows in via the vertical connecting pipe and flows out via the transverse connecting pipe, thus the side of the vertical connecting pipe is in the high pressure zone and the side of the transverse connecting pipe is in the low pressure zone. Under the action of pressure difference of the system, the piston component moves upward to open the bypass through hole, and the refrigerant flows to the side of the transverse connecting pipe via the bypass through hole, thereby achieving the object of reverse communication.

In the above structure, the piston component and the valve needle component are located at the same side of the valve core seat, that is, the piston component and the valve needle component are both located at an upper side of the valve core seat, instead of being respectively arranged at two sides of the valve seat, thus when the refrigerant flows forwards, the valve needle component will not be subjected to an impact force from the refrigerant with high pressure in the side of the transverse connecting pipe. Therefore, a buffer spring provided in the valve needle component may be set to have a small spring force, and the valve needle component may easily seal the valve core valve port and will not be pushed away when the refrigerant has a high pressure, and may ensure the sealing performance even when the pressure of the refrigerant is at 3.5 Mpa.

Furthermore, in the above structure, the piston component is at the upper side of the valve core seat, that is, the piston component is arranged in the valve cavity, thus a stroke of the piston component may fully utilize the space of the valve cavity above the valve core seat, which omits the structural design of the inlet connecting pipe seat and the secondary valve cavity in the background technology, thereby reducing the axial dimension of the valve seat. Furthermore, according to the present application, after the piston component is pushed away, the refrigerant may directly enter into the side of the transverse connecting pipe, which omits the design of the bypass flow passage in the conventional technology, thereby reducing the flow resistance. In addition, since the bypass flow passage is not required, the radial dimension of the valve seat is also reduced.

In summary, the electronic expansion valve according to the present application may, on one hand, ensure that the valve needle component may seal the valve core valve port easily in a high pressure state when the refrigerant flows forwards, thereby preventing the valve needle component from being pushed away by the refrigerant with high pressure, and on the other hand, reduce the axial dimension and the radial dimension of the valve seat, and reduce the flow resistance when the refrigerant flows reversely.

Figure 1:
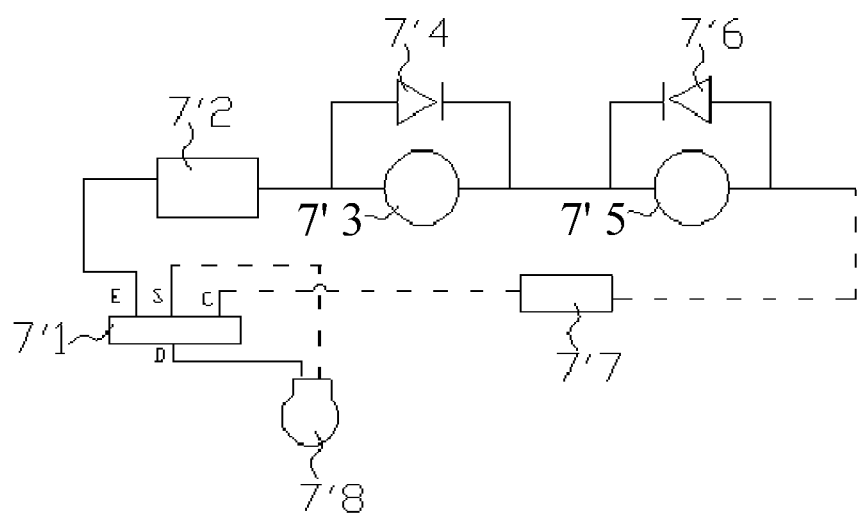
FIG. 1 is a schematic view showing the operating principle of an air conditioning refrigerating system in the conventional technology.
Figure 2:
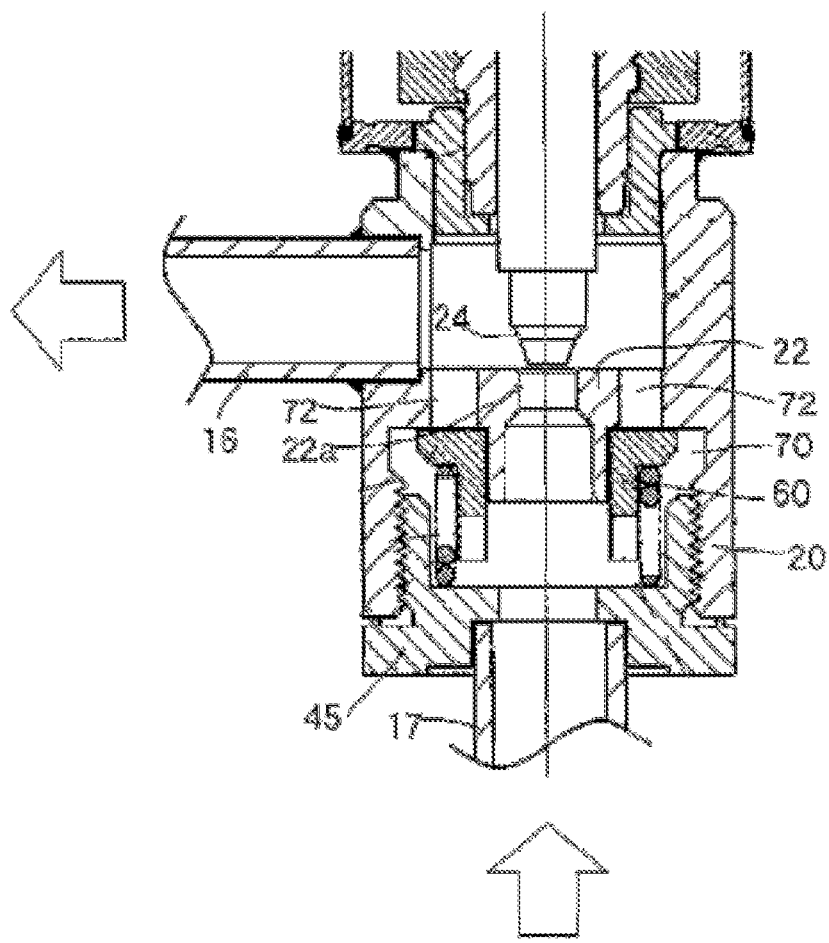
FIG. 2 is a schematic view showing the structure of an electronic expansion valve in the conventional technology which is performing a flow regulation when the refrigerant flows forwards.
Figure 3:
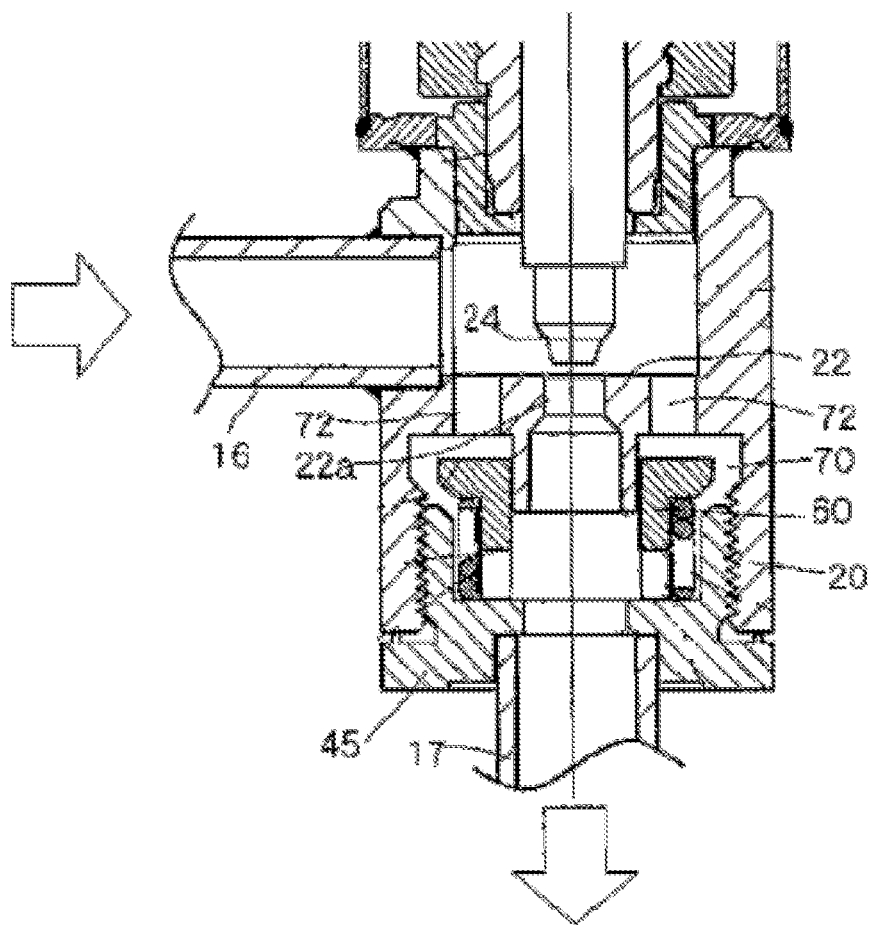
FIG. 3 is a schematic view showing the structure of the electronic expansion valve in the conventional technology, wherein the electronic expansion valve is opened when the refrigerant flows reversely.

Corresponding relationships between reference numerals and components in FIGS. 1 to 3 are as follows:

| 7'1 | four-way valve, | 7'2 | outdoor heat exchanger, |
|---|---|---|---|
| 7'3 | first electronic expansion valve, | 7'4 | first one-way valve, |
| 7'5 | second electronic expansion valve, | 7'6 | second one-way valve, |
| 7'7 | indoor heat exchanger, | 7'8 | compressor; |
| 20 | valve seat, | 22 | valve core seat, |
| 22a | valve port, | 72 | small hole, |
| 45 | inlet connecting pipe seat, | 60 | one-way valve core, |
| 17 | inlet connecting pipe, | 16 | outlet connecting pipe, |
| 24 | valve needle, and | 70 | bypass flow passage. |

Corresponding relationships between reference numerals and components in FIGS. 4 to 12 are as follows:

| 1 | valve seat, | 11 | valve cavity; |
|---|---|---|---|
| 2 | valve core seat, | 21 | body portion, |
| 211 | valve core valve port, | 212 | bypass through hole, |
| 22 | sleeve guiding portion, | 221 | positioning groove, |
| 222 | sidewall through hole; | 3 | valve needle component; |
| 4 | piston component, | 41 | center hole, |
| 411 | positioning protrusion, | 42 | cutout portion, |
| 43 | piston body portion, | 44 | piston guiding portion, |
| 441 | piston side hole; | 51 | transverse connecting pipe, |
| 52 | vertical connecting pipe; | 61 | screw rod, |
| 62 | nut; and | 7 | elastic component. |

DETAILED DESCRIPTION OF THE INVENTION

An object of the present application is to provide an electronic expansion valve, and the structural design of the electronic expansion valve may, on one hand, ensure that the valve needle component may seal the valve core valve port easily in a high pressure state when the refrigerant flows forwards, thereby preventing the valve needle component from being pushed away by the refrigerant with high pressure, and on the other hand, reduce the axial dimension and the radial dimension of the valve seat, and reduce the flow resistance when the refrigerant flows reversely.

For those skilled in the art to better understand the technical solutions of the present application, the present application is described in detail in conjunction with drawings and embodiments hereinafter.

Figure 4:
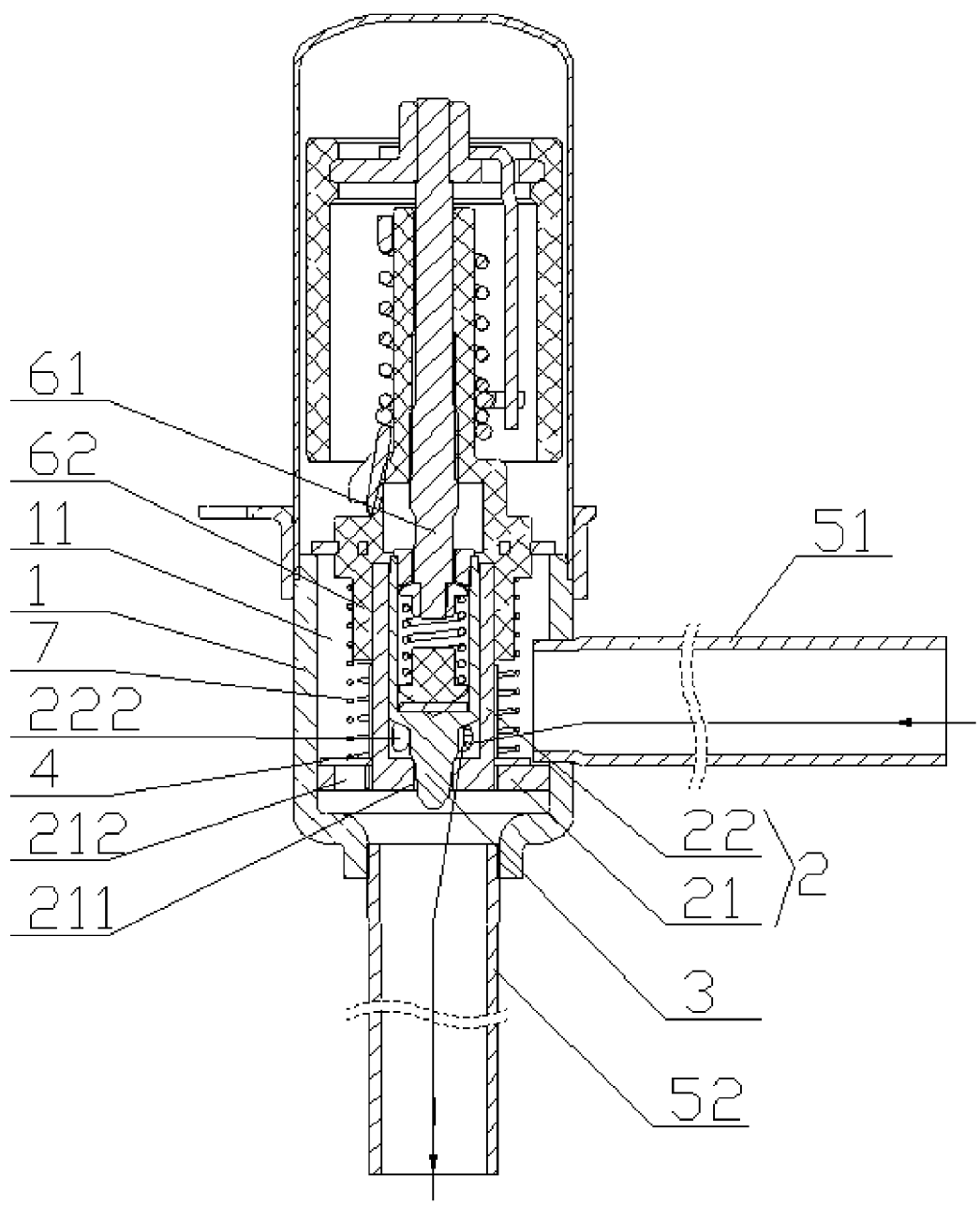
FIG. 4 is a schematic view showing the structure of an electronic expansion valve according to a first embodiment of the present application when refrigerant flows forwards.
Figure 5:
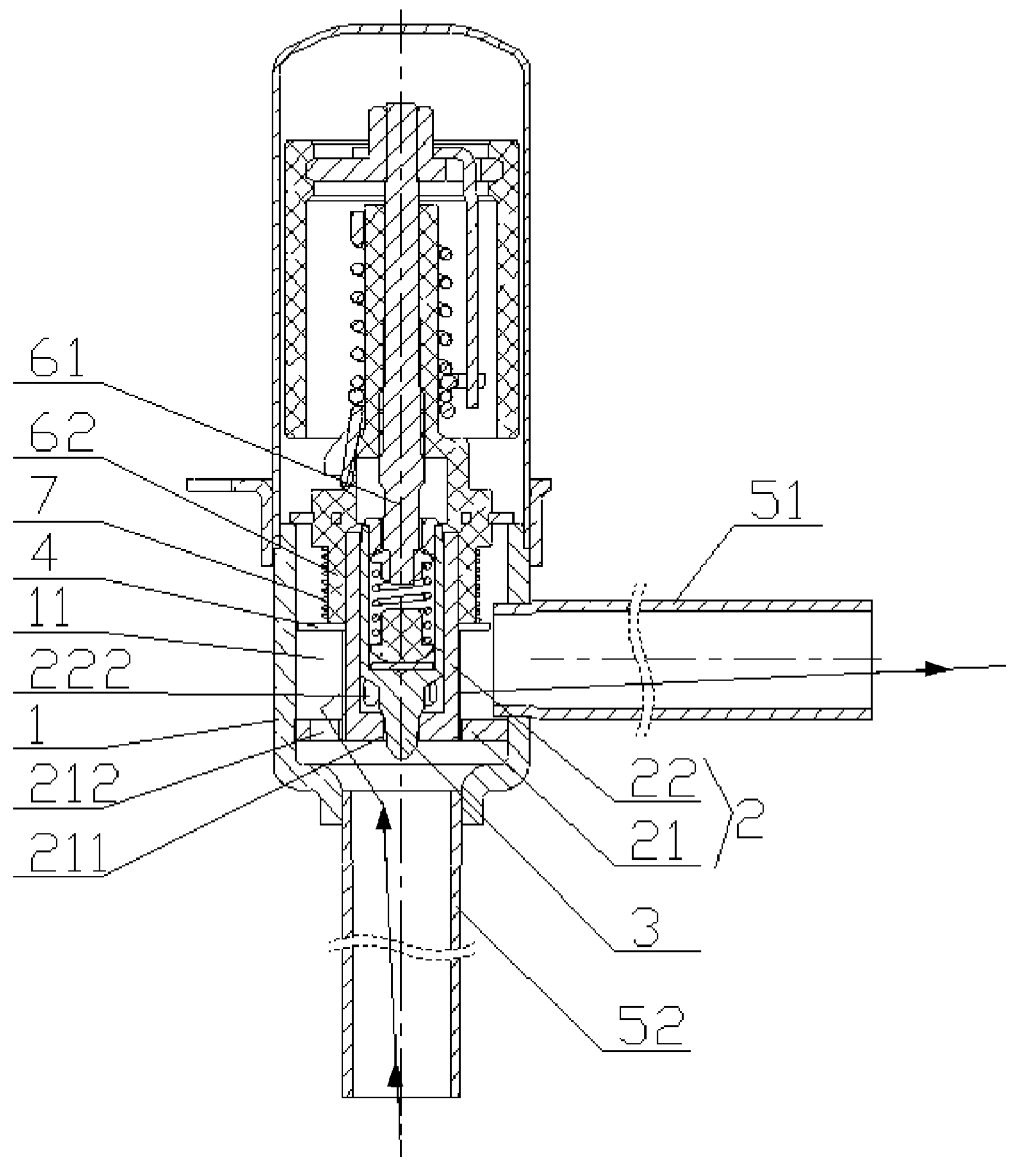
FIG. 5 is a schematic view showing the structure of the electronic expansion valve according to the first embodiment of the present application when the refrigerant flows reversely.

Reference is made to FIGS. 4 and 5. FIG. 4 is a schematic view showing the structure of an electronic expansion valve according to a first embodiment of the present application when refrigerant flows forwards; and FIG. 5 is a schematic view showing the structure of the electronic expansion valve according to the first embodiment of the present application when the refrigerant flows reversely.

According to the first embodiment of the present application, as shown in FIGS. 4 and 5, an electronic expansion valve according to the present application includes a valve seat 1. The valve seat 1 is provided with a valve cavity 11, a valve core seat 2 is fixed in the valve cavity 1, and the valve core seat 2 is provided with a valve core valve port 211 and a bypass through hole 212. The electronic expansion valve further includes a valve needle component 3 which is movable in an axial direction to cooperate with the valve core valve port 211 and a piston component 4 which is movable in the axial direction to open and close the bypass through hole 212. The electronic expansion valve further includes a transverse connecting pipe 51 functioning as an inlet connecting pipe and a vertical connecting pipe 52 functioning as an outlet connecting pipe.

Based on the above structure, as shown in FIGS. 4 and 5, the piston component 4 and the valve needle component 3 are located at the same side of the valve core seat 2, thus when the refrigerant flows forwards, the piston component 4 closes the bypass through hole 212, the refrigerant flows to the side of the vertical connecting pipe 52 via the valve core valve port 211, and the valve needle component 3 moves in the axial direction to regulate an opening of the valve core valve port 211. When the refrigerant flows reversely, the piston component 4 moves upwards in the axial direction to open the bypass through hole 212, and the refrigerant flows to the side of the transverse connecting pipe 51 via the bypass through hole 212.

When the refrigerant flows forwards, the refrigerant flows in via the transverse connecting pipe 51 and flows out via the vertical connecting pipe 52, thus the side of the transverse connecting pipe 51 is in a high pressure zone and the side of the vertical connecting pipe 52 is in a low pressure zone. Under the action of pressure difference of the system, the piston component 4 moves downward to close the bypass through hole 212. Then the valve needle component 3 is driven by a drive component of the electronic expansion valve to move upward and downward in the axial direction, thereby regulating the opening of the valve core valve port 211 and achieving the object of regulating the flow of the refrigerant.

When the refrigerant flows reversely, the refrigerant flows in via the vertical connecting pipe 52 and flows out via the transverse connecting pipe 51, thus the side of the vertical connecting pipe 52 is in the high pressure zone and the side of the transverse connecting pipe 51 is in the low pressure zone. Under the action of pressure difference of the system, the piston component 4 moves upward to open the bypass through hole 212, and the refrigerant flows to the side of the transverse connecting pipe 51 via the bypass through hole 212, thereby achieving the object of reverse communication.

In the above structure, the piston component 4 and the valve needle component 3 are located at the same side of the valve core seat 2, that is, the piston component 4 and the valve needle component 3 are both located at an upper side of the valve core seat 2, instead of being respectively arranged at two sides of the valve seat 2, thus when the refrigerant flows forwards, the valve needle component 3 will not be subjected to an impact force from the refrigerant with high pressure in the side of the transverse connecting pipe 51. Therefore, a buffer spring provided in the valve needle component 3 may be set to have a small spring force, and the valve needle component 3 may easily seal the valve core valve port 211 and will not be pushed away when the refrigerant has a high pressure, and may ensure the sealing performance even when the pressure of the refrigerant is at 3.5 Mpa.

Furthermore, in the above structure, the piston component 4 is at the upper side of the valve core seat 2, that is, the piston component 4 is arranged in the valve cavity 11, thus a stroke of the piston component 4 may fully utilize the space of the valve cavity 11 above the valve core seat 2, which omits the structural design of the inlet connecting pipe seat and the secondary valve cavity in the background technology, thereby reducing the axial dimension of the valve seat 1. Furthermore, according to the present application, after the piston component 4 is pushed away, the refrigerant may directly enter into the side of the transverse connecting pipe 51, which omits the design of the bypass flow passage in the conventional technology, thereby reducing the flow resistance. In addition, since the bypass flow passage is not required, the radial dimension of the valve seat 1 is also reduced.

In summary, the electronic expansion valve according to the present application may, on one hand, ensure that the valve needle component 3 may seal the valve core valve port 211 easily in a high pressure state when the refrigerant flows forwards, thereby preventing the valve needle component 3 from being pushed away by the refrigerant with high pressure, and on the other hand, reduce the axial dimension and the radial dimension of the valve seat 1, and reduce the flow resistance when the refrigerant flows reversely.

It is to be noted that, like the structure of the valve core seat 2 in the background technology, the valve core seat 2 according to the present application may be formed integrally with the valve seat 1, that is, the valve core seat 2 is formed inside the valve seat 1 by lathing. Certainly, as shown is FIGS. 4 and 5, the valve core seat 2 and the valve seat 1 may also be formed separately. The valve core seat 2 is fixedly connected to an inner wall of the valve seat 1. Specifically, an outer circumferential wall of the valve core seat 2 is welded to the inner wall of the valve seat 1.

Figure 6:
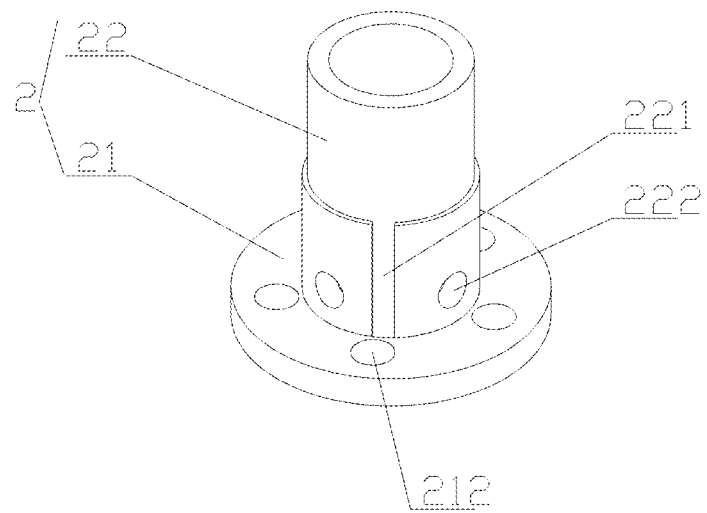
FIG. 6 is a schematic view showing the structure of a valve core seat of the electronic expansion valve in FIGS. 4 and 5.
Figure 7:
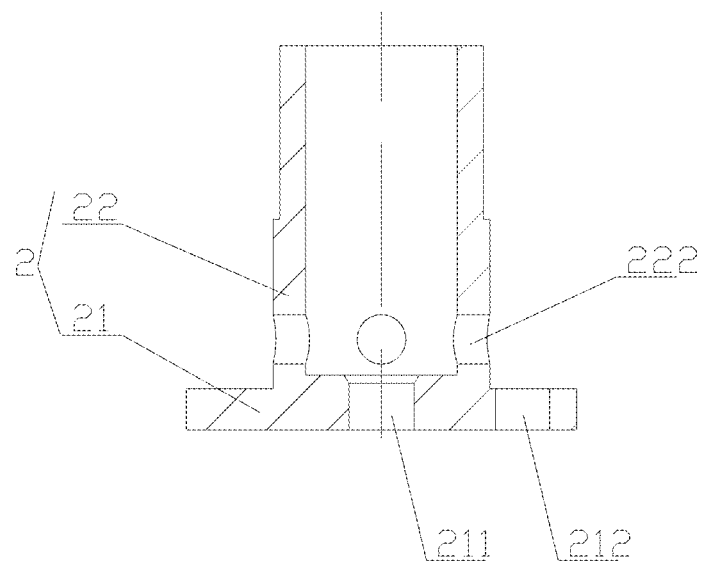
FIG. 7 is a sectional view of the valve core seat in FIG. 6.

Based on the above structure, the specific structures of the valve core seat 2 and the piston component 4 may be designed. For example, reference is made to FIGS. 6, 7 and 8. FIG. 6 is a schematic view showing the structure of a valve core seat of the electronic expansion valve in FIGS. 4 and 5; FIG. 7 is a sectional view of the valve core seat in FIG. 6; and FIG. 8 is a schematic view showing the structure of a piston component of the electronic expansion valve in FIGS. 4 and 5.

As shown in FIGS. 6 and 7, the valve core seat 2 includes a body portion 21 and a sleeve guiding portion 22. The valve core valve port 211 and the bypass through hole 212 are provided on the body portion 21. A lower end of the sleeve guiding portion 22 surrounds the valve core valve port 211, and the valve needle component 3 extends into an inner hole of the sleeve guiding portion 22 to cooperate with the valve core valve port 211 and is guided by the inner hole of the sleeve guiding portion 22. In such structural design, the inner hole of the sleeve guiding portion 22 may be integrally formed with the valve core valve port 211, which may ensure a good coaxiality between the inner hole of the sleeve guiding portion 22 and the valve core valve port 211. The valve needle component 3 extends into and is guided by the inner hole of the sleeve guiding portion 22, which ensures a good coaxiality between the valve needle component 3 and the valve core valve port 211, thereby providing a good sealing performance. Furthermore, the sleeve guiding portion 22 may also resist the impact on the valve needle component 3 from the refrigerant with high pressure, thereby preventing an eccentricity and a radial vibration of the valve needle component 3, and ensuring the sealing performance.

Figure 8:
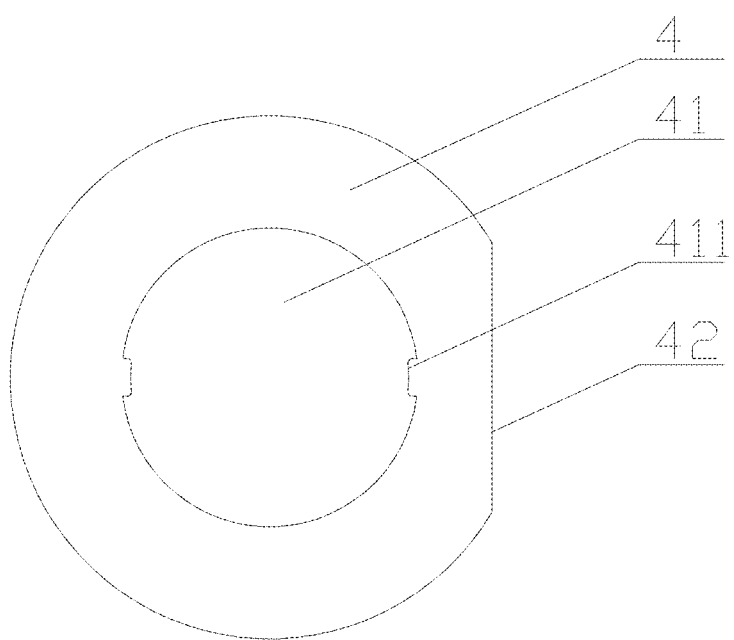
FIG. 8 is a schematic view showing the structure of a piston component of the electronic expansion valve in FIGS. 4 and 5.

Furthermore, as shown in FIG. 8, the piston component 4 is provided with a center hole 41, and the piston component 4 is axially movably sleeved on an outer wall of the sleeve guiding portion 22 via the center hole 41. Such structural design may guide the axial movement of the piston component 4 and prevent the inclination of the piston component 4, thereby ensuring the sealing performance.

Furthermore, as shown in FIGS. 6 and 8, one of an inner wall of the center hole 41 and an outer wall of the sleeve guiding portion 22 is provided with a positioning groove 221 extending in the axial direction, and the other one is provided with a positioning protrusion 411 slidable in the positioning groove 221. Further, a cutout portion 42 is formed by cutting out a portion of the piston component 4 at a side facing the transverse connecting pipe 51.

In the above structure, the design of the cutout portion 42 may prevent an interference between the piston component 4 and the transverse connecting pipe 51. Furthermore, the structural design of the positioning groove 221 and the positioning protrusion 411 may prevent the circumferential rotation of the piston component 4, thereby preventing the remaining portion of the piston component 4 except for the cutout portion 42 from rotating to the side of the transverse connecting pipe 51 to cause an interference with the transverse connecting pipe 51.

Furthermore, as shown in FIGS. 6 and 7, a side wall of the sleeve guiding portion 22 is provided with a sidewall through hole 222 which is configured to communicate the inner hole of the sleeve guiding portion 22 and the valve cavity 11. In such structure, when the refrigerant flows reversely, the refrigerant flows through the valve core valve port 211, the inner hole of the sleeve guiding portion 22 and the side wall through hole 222, and then flows into the valve cavity 11 and finally flows into the side of the transverse connecting pipe 51.

Furthermore, as shown in FIGS. 4 and 5, the electronic expansion valve further includes a drive component configured to drive the valve needle component 3 to move in the axial direction. The drive component includes a screw rod 61 and a nut 62 which cooperates with the screw rod 61 by screw threads. A lower portion of the nut 62 is provided with a guiding hole, and an upper portion of the sleeve guiding portion 22 is fit in the guiding hole via the outer wall of the sleeve guiding portion 22 and is guided by the guiding hole. In such structural design, the valve core seat 2 is further supported and guided by the nut 62, which may further improve the coaxiality between the valve needle component 3 and the valve core valve port 211, thereby ensuring the sealing performance between the valve needle component 3 and the valve core valve port 211.

Furthermore, as shown in FIGS. 4 and 5, a compressed elastic component 7 is provided between a top wall of the piston component 4 and the nut 62. The nut 62 is provided with a protruding portion in a circumferential direction, and an upper end of the compressed elastic component 7 abuts against the protruding portion. When the flow of the refrigerant changes to a forward flow from the reverse flow, the design of the elastic component 7 enables the piston component 4 to be restored to close the bypass through hole 212.

Figure 9:
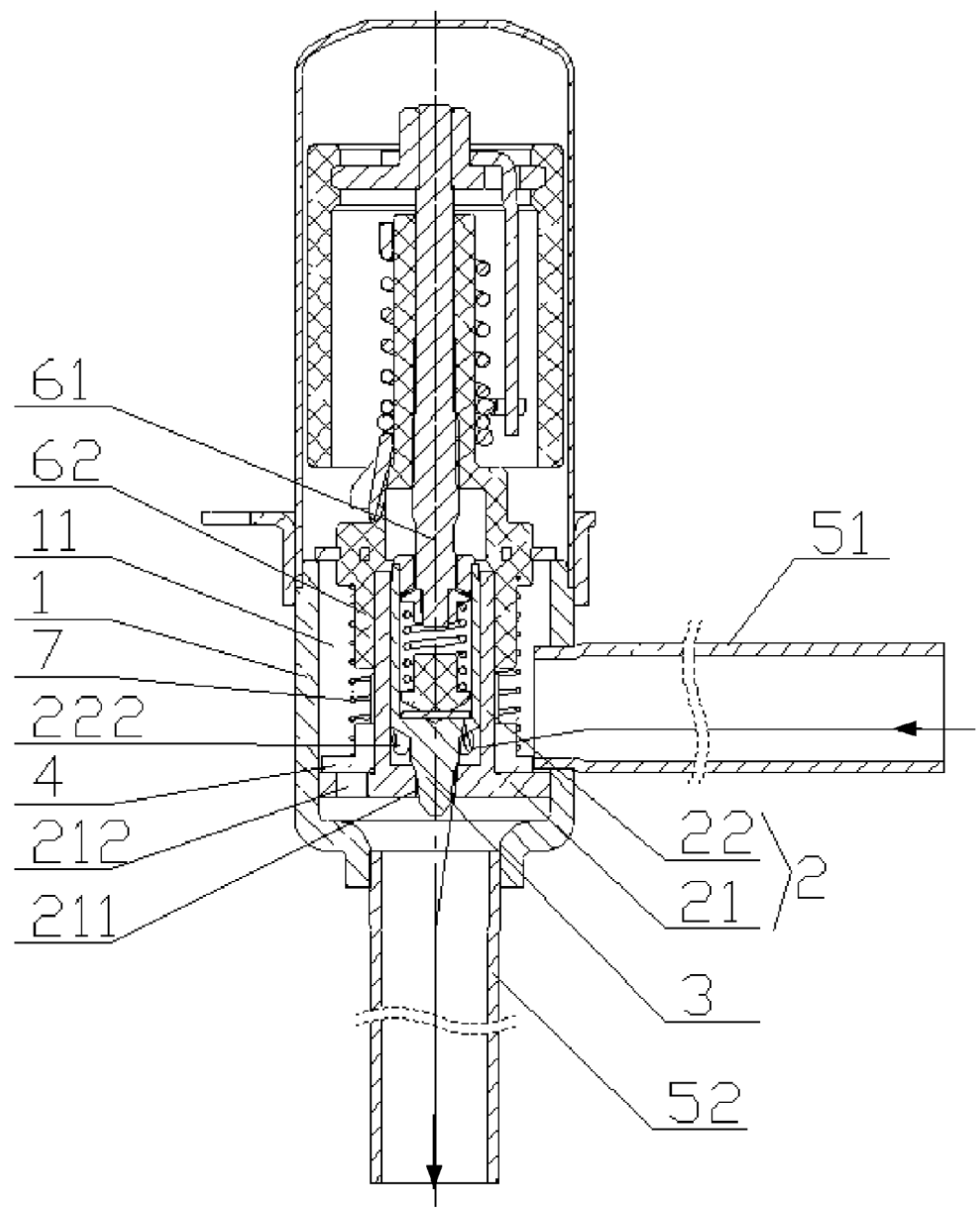
FIG. 9 is a schematic view showing the structure of an electronic expansion valve according to a second embodiment of the present application when the refrigerant flows forwards.
Figure 10:
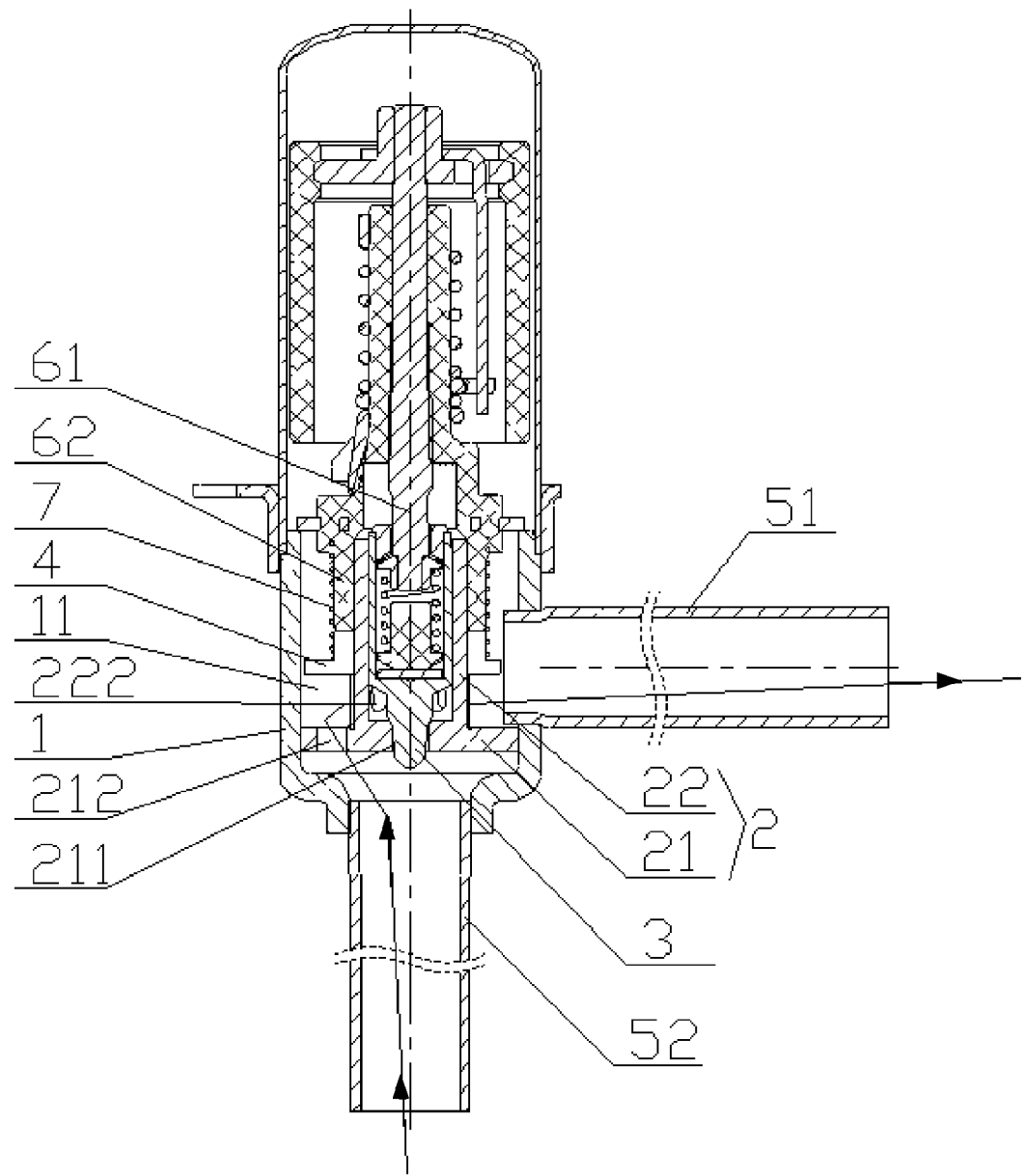
FIG. 10 is a schematic view showing the structure of the electronic expansion valve according to the second embodiment of the present application when the refrigerant flows reversely.
Figure 11:
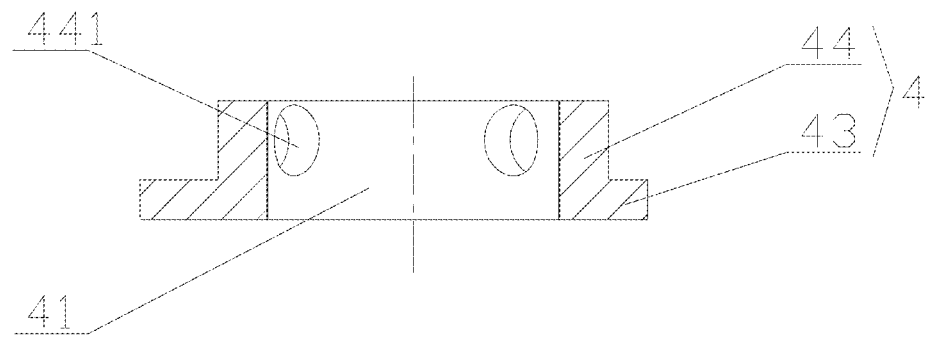
FIG. 11 is a schematic view showing the structure of a piston component of the electronic expansion valve in FIGS. 9 and 10.
Figure 12:
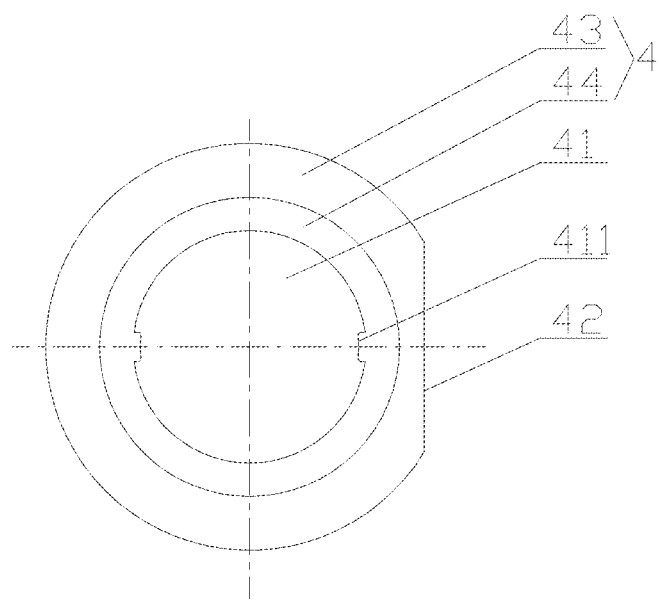
FIG. 12 is a top view of the piston component in FIG. 11.

Furthermore, a second embodiment is further provided according to the present application. Reference is made to FIGS. 9, 10, 11 and 12. FIG. 9 is a schematic view showing the structure of an electronic expansion valve according to the second embodiment of the present application when the refrigerant flows forwards; FIG. 10 is a schematic view showing the structure of the electronic expansion valve according to the second embodiment of the present application when the refrigerant flows reversely; FIG. 11 is a schematic view showing the structure of a piston component of the electronic expansion valve in FIGS. 9 and 10; and FIG. 12 is a top view of the piston component in FIG. 11.

The structure of the electronic expansion valve in the second embodiment is substantially identical to the structure of the electronic expansion valve in the first embodiment described above, and thus will not be described herein. Unlike the first embodiment, in the second embodiment as shown in FIG. 11, the piston component 4 includes a piston body portion 43 and a piston guiding portion 44 protruding upwards along the piston body portion 43. A center hole 41 passes through the piston body portion 43 and the piston guiding portion 44. A sidewall of the piston guiding portion 44 is further provided with a piston side hole 441 at a position corresponding to the sidewall through hole 222.

In the above structure, the design of the piston guiding portion 44 may guide the movement of the piston component 4 in the axial direction, to allow the movement of the piston component 4 in the axial direction to be more stable and reliable, thus the piston component 4 may open and close the bypass through hole 212 more reliably.

An electronic expansion valve according to the present application is described in detail hereinbefore. The principle and the embodiments of the present application are illustrated herein by specific examples. The above description of examples is only intended to help the understanding of the method and idea of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An electronic expansion valve, comprising a valve seat, the valve seat being provided with a valve cavity, a valve core seat being fixed in the valve cavity, and the valve core seat being provided with a valve core valve port and a bypass through hole; the electronic expansion valve further comprising a valve needle component which is movable in an axial direction to cooperate with the valve core valve port and a piston component which is movable in the axial direction to open and close the bypass through hole; and the electronic expansion valve further comprising a transverse connecting pipe functioning as an inlet connecting pipe and a vertical connecting pipe functioning as an outlet connecting pipe, the transverse connecting pipe and the vertical connecting pipe are installed on the valve seat; wherein, the piston component and the valve needle component are located at a same side of the valve core seat, and in a case that refrigerant flows forwards, the piston component closes the bypass through hole, the refrigerant flows to a side of the vertical connecting pipe via the valve core valve port, and the valve needle component moves in the axial direction to regulate an opening of the valve core valve port; and in a case that the refrigerant flows reversely, the piston component moves upwards in the axial direction to open the bypass through hole, and the refrigerant flows to a side of the transverse connecting pipe via the bypass through hole.

2. The electronic expansion valve according to claim 1, wherein the valve core seat and the valve seat are formed separately, and the valve core seat is fixedly connected to an inner wall of the valve seat.

3. The electronic expansion valve according to claim 2, wherein the valve core seat comprises a body portion and a sleeve guiding portion; the valve core valve port and the bypass through hole are arranged in the body portion, and a lower end of the sleeve guiding portion surrounds the valve core valve port, and the valve needle component extends into an inner hole of the sleeve guiding portion to cooperate with the valve core valve port and is guided by the inner hole of the sleeve guiding portion.

4. The electronic expansion valve according to claim 3, wherein the piston component is provided with a center hole, and the piston component is axially movably sleeved on an outer wall of the sleeve guiding portion via the center hole.

5. The electronic expansion valve according to claim 4, wherein one of an inner wall of the center hole and an outer wall of the sleeve guiding portion is provided with a positioning groove extending in an axial direction, and the other one of the inner wall of the center hole and the outer wall of the sleeve guiding portion is provided with a positioning protrusion slidable in the positioning groove.

6. The electronic expansion valve according to claim 5, wherein a side of the piston component facing the transverse connecting pipe has a portion being cut out to form a cutout portion.

7. The electronic expansion valve according to claim 4, wherein the piston component comprises a piston body portion and a piston guiding portion protruding upwards along the piston body portion, and the center hole passes through the piston body portion and the piston guiding portion.

8. The electronic expansion valve according to claim 7, wherein a sidewall of the sleeve guiding portion is provided with a sidewall through hole which is configured to communicate the inner hole of the sleeve guiding portion with the valve cavity; and a sidewall of the piston guiding portion is further provided with a piston side hole at a position corresponding to the sidewall through hole.

9. The electronic expansion valve according to claim 7, further comprising a drive component configured to drive the valve needle component to move in the axial direction, wherein the drive component comprises a screw rod and a nut cooperating with the screw rod by screw threads; and
a lower portion of the nut is provided with a guiding hole, and an upper portion of the sleeve guiding portion is fit in the guiding hole via an outer wall of the sleeve guiding portion and is guided by the guiding hole.

10. The electronic expansion valve according to claim 9, wherein a compressed elastic component is provided between a top wall of the piston component and the nut.

11. The electronic expansion valve according to claim 8, further comprising a drive component configured to drive the valve needle component to move in the axial direction, wherein the drive component comprises a screw rod and a nut cooperating with the screw rod by screw threads; and
a lower portion of the nut is provided with a guiding hole, and an upper portion of the sleeve guiding portion is fit in the guiding hole via an outer wall of the sleeve guiding portion and is guided by the guiding hole.

12. The electronic expansion valve according to claim 11, wherein a compressed elastic component is provided between a top wall of the piston component and the nut.

13. The electronic expansion valve according to claim 3, wherein a sidewall of the sleeve guiding portion is provided with a sidewall through hole which is configured to communicate the inner hole of the sleeve guiding portion with the valve cavity.

14. The electronic expansion valve according to claim 13, further comprising a drive component configured to drive the valve needle component to move in the axial direction, wherein the drive component comprises a screw rod and a nut cooperating with the screw rod by screw threads; and
a lower portion of the nut is provided with a guiding hole, and an upper portion of the sleeve guiding portion is fit in the guiding hole via an outer wall of the sleeve guiding portion and is guided by the guiding hole.

15. The electronic expansion valve according to claim 14, wherein a compressed elastic component is provided between a top wall of the piston component and the nut.

16. The electronic expansion valve according to claim 3, further comprising a drive component configured to drive the valve needle component to move in the axial direction, wherein the drive component comprises a screw rod and a nut cooperating with the screw rod by screw threads; and
a lower portion of the nut is provided with a guiding hole, and an upper portion of the sleeve guiding portion is fit in the guiding hole via an outer wall of the sleeve guiding portion and is guided by the guiding hole.

17. The electronic expansion valve according to claim 16, wherein a compressed elastic component is provided between a top wall of the piston component and the nut.

18. The electronic expansion valve according to claim 4, further comprising a drive component configured to drive the valve needle component to move in the axial direction, wherein the drive component comprises a screw rod and a nut cooperating with the screw rod by screw threads; and
a lower portion of the nut is provided with a guiding hole, and an upper portion of the sleeve guiding portion is fit in the guiding hole via an outer wall of the sleeve guiding portion and is guided by the guiding hole.

19. The electronic expansion valve according to claim 18, wherein a compressed elastic component is provided between a top wall of the piston component and the nut.

* * * * *